Oct. 26, 1937.   L. F. CARTER   2,096,785
AUTOMATIC SHUT-OFF VALVE
Filed Feb. 11, 1936
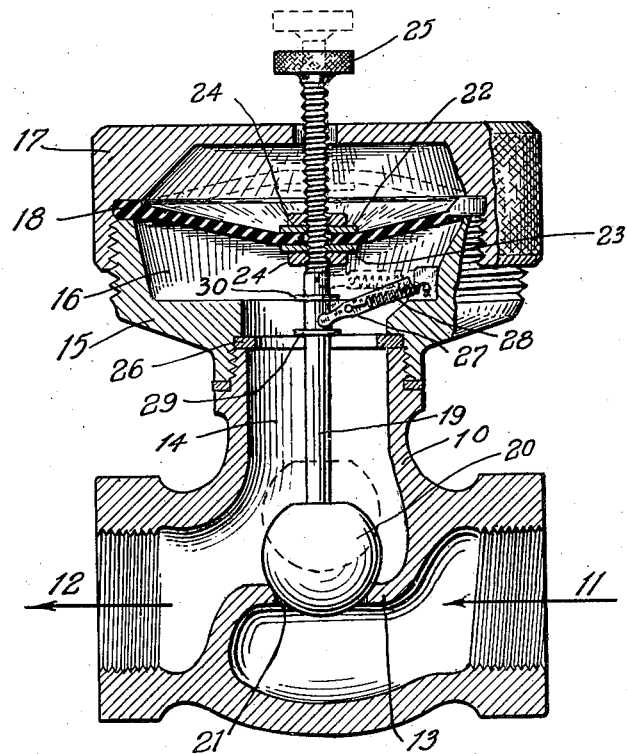
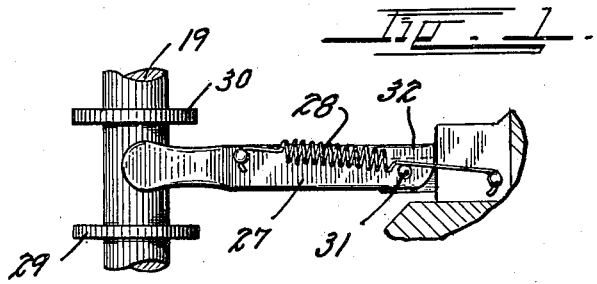
INVENTOR.
LEONARD F. CARTER
BY
ATTORNEY.

Patented Oct. 26, 1937

2,096,785

UNITED STATES PATENT OFFICE 2,096,785

AUTOMATIC SHUT-OFF VALVE

Leonard F. Carter, Colorado Springs, Colo.

Application February 11, 1936, Serial No. 63,341

1 Claim. (Cl. 137—153)

This invention relates to an automatic gas control valve. It often happens that the gas supply to water heaters, furnaces, household appliances, etc. is interrupted due to a breakage in the supply line, failure in the supply, accidental closure of a main valve, etc. This, of course, allows all burners on the line to become extinguished. Often the burner valves are not closed and when the gas supply is resumed, the raw gas will flow from the burners with a possibility of asphyxiation, explosions, fires, etc.

The improved valve is more particularly designed for domestic service and it can be placed adjacent the house meter where it will control the entire gas supply or it may be placed in the individual supply lines to the individual burners.

The principal object of this invention is to provide a simple, positive, inexpensive valve which will automatically close off the gas supply in case of interrupted service so that resumption of the gas supply will not result in gas escaping at the burners.

Other objects of the invention are to so construct the valve that it will have relatively few parts; will avoid the necessity for stuffing boxes and packing; will be economical to manufacture and so that it can be easily returned to the operative position when it is desired to again use the apparatus to which it is connected.

Other objects and advantages reside in the detailed construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 illustrates a vertical longitudinal section through a gas supply valve in which the invention is embodied.

Fig. 2 is an enlarged detail view of the locking lever which may be employed in the valve.

The embodiment illustrated comprises a valve housing 10 provided with an intake opening 11 and a discharge opening 12. The intake and discharge openings are separated by means of a horizontal partition 13, as is usual in globe valve constructions.

The housing 10 is formed with an upwardly extending threaded valve stem collar 14 upon which is threaded a cup member 15 forming a diaphragm chamber 16. The chamber is covered by means of a threaded cap 17 and a flexible diaphragm 18, of rubber, rubberized fabric, leather or similar flexible material, is clamped between the cap 17 and the cup member 15.

A valve stem 19 extends downwardly through the cap 17, the diaphragm 18, the cup 15, and through the collar 14, terminating in a valve member 20 which closes a valve seat 21 in the partition 13.

It is preferred to have the valve member 20 of the ball type, although it can have any desired shape. At the point where the valve stem 19 passes through the gasket 18, two clamping disc nuts 22 and 23 are provided. These nuts are threaded upon the valve stem 19 and serve to firmly clamp the diaphragm at this point to form a gas tight joint. To further seal the joint and to prevent movement of the nut discs 22 and 23, lock nuts 23 are provided.

The upper extremity of the valve stem is formed with a finger button 25 which is preferably free to rotate on the valve stem to prevent accidental rotation of the latter.

Let us assume that gas is flowing into the passage 11, through the valve seat 21, and from the passage 12 to a gas appliance. Gas from the passage 12 will pass through the sleeve 14 to reach the bottom of the diaphragm 18. The pressure of this gas forces the latter upwardly to the broken line position, thus, holding the valve member 20 suspended above the valve seat 21, as indicated in broken line on the drawing. This position of the valve is retained as long as there is pressure in the supply pipe at 11.

Should the pressure drop to a dangerous point or should it cease altogether, there will not be sufficient pressure to hold the diaphragm in its supported position and the weight of the valve member 20 will cause it to drop and close the seat 21. The weight of the valve member and the diameter of the seat are so proportioned that should the pressure again be resumed in the passage 11, it will not be sufficient to lift the valve 20 from its seat. It will be noted that at this time the gas has much less area to work against than when the diaphragm 18 is in operation. Therefore gas can not flow to the appliance until the valve stem is manually raised by the attendant. This will again allow pressure to enter below the diaphram and cause the valve to again resume its operating position.

It is intended that the weight of the valve 20 will be sufficient under ordinary conditions to maintain it on its seat.

For situations where an unusually high pressure is encountered a locking lever 27 actuated by a tension spring 28, may be employed. The lever 27 terminates in a bifurcated extremity which overlaps the valve stem 19 between a lower flange 29 and an upper flange 30. The other extremity is hinged on a hinge pin 31 so that the lever may swing downward but cannot swing upward due to an overlapping extremity 32.

As the valve moves to the closed position, the upper flange 30 strikes the lever 27 so as to swing the latter to the position of Fig. 1. When in the latter position, the spring 28 is below the hinge pin so that the tension of the spring pulls downward to hold the valve 20 against its seat. When the valve is pulled open, the lower flange 29 strikes the lever and the spring 28 snaps the lever to the position of Fig. 2 where it is out of engagement with both flanges.

While a specific form of the improvement has been described and illustrated herein, it is desired to be understood that the same may be varied, within the scope of the appended claim, without departing from the spirit of the invention.

Having thus described the invention, what is claimed and desired secured by Letters Patent is:—

An automatic gas control valve comprising: a valve housing; a horizontal partition in said valve housing; a discharge passage above said partition; an intake passage below said partition; a port through said partition; a ball closing said port and resting on said partition; a threaded shaft secured to and extending upwardly from said ball; a diaphragm closing the top of said discharge passage; said threaded shaft passing through said diaphragm and being sealed thereto; a cap covering said diaphragm and clamping the latter in place, said shaft extending through and projecting above said cap, said diaphragm being sufficiently flexible so that the weight of said ball will force it against said seat when there is no pressure in said discharge passage; and a spring actuated latch for holding said ball against said seat, said latch being normally out of contact with said ball and shaft; and means for bringing said latch into active position when said ball contacts said seat.

LEONARD F. CARTER.